Nov. 21, 1944.　　　　　G. RITTER　　　　　2,363,261

EXTRUSION DIE ASSEMBLY

Filed Oct. 2, 1942　　　　2 Sheets-Sheet 1

INVENTOR
GEORGE RITTER.
BY
ATTORNEY

Nov. 21, 1944.                    G. RITTER                    2,363,261
                            EXTRUSION DIE ASSEMBLY
                            Filed Oct. 2, 1942            2 Sheets-Sheet 2
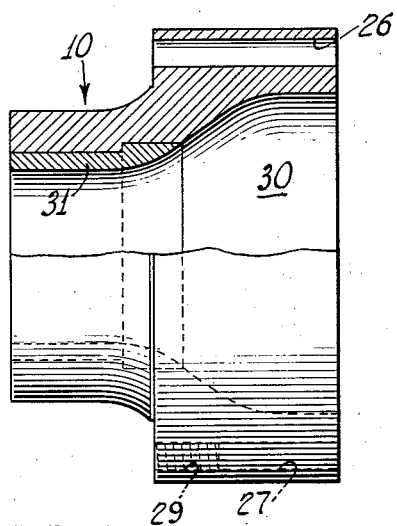
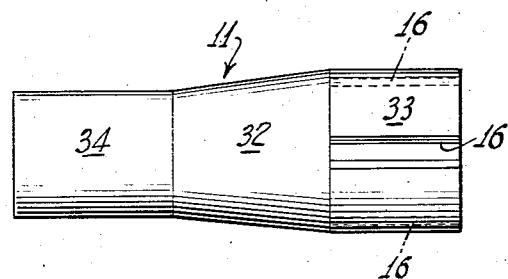
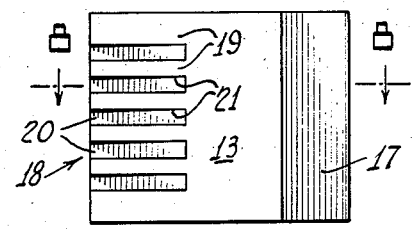
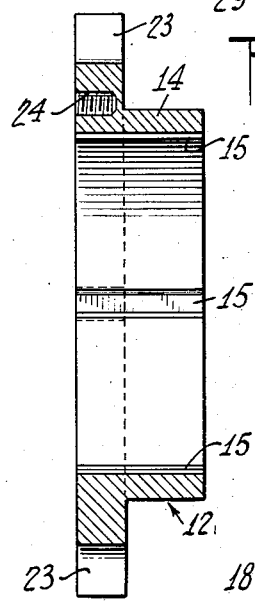
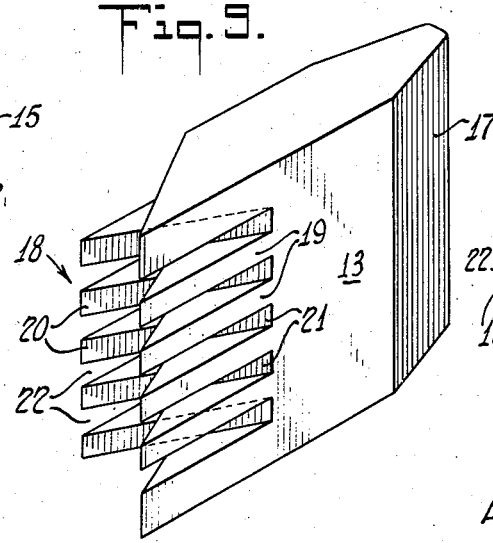
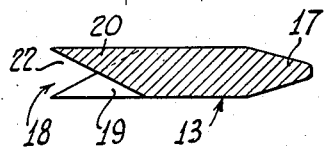
INVENTOR
GEORGE RITTER
BY
ATTORNEY Patented Nov. 21, 1944

2,363,261

UNITED STATES PATENT OFFICE 2,363,261

EXTRUSION DIE ASSEMBLY

George Ritter, Millington, N. J., assignor to The Ruberoid Co., New York, N. Y., a corporation of New Jersey Application October 2, 1942, Serial No. 460,542

2 Claims. (Cl. 18—14)

This invention relates to an extrusion die assembly for apparatus for extruding pipe of asbestos-cement and the like, and more particularly to a die assembly of the type comprising a die nozzle, a core, and a spider or core bridge for supporting the core.

With dies of this type the material being extruded is separated longitudinally into sections as it passes the spider arms. The material is subsequently compressed greatly as it is expressed through the die, and the sections are autogenously united into a dense, solid, homogeneous body of tubular form. In the pipe as extruded the joints are completely obliterated.

It has been found that when pipes made in this manner are subjected to severe hydrostatic pressure, areas of weakness sometimes develop along the lines of the original butt joints of the sections. This probably is caused by the failure of the asbestos-cement, when set, to bond as firmly at the joints as elsewhere throughout the pipe.

The principal object of the present invention is to overcome that objection by providing means for forming reenforced joints between the sections and increasing the area of their surface contact.

Another object of the invention is to provide the die assembly with means for adjusting the nozzle relatively to the core to control extrusion of the pipe in a straight length.

According to my invention, the arms of the spider or core bridge are shaped to mold alternate tongues and grooves in the opposed surfaces of the sections as the material is extruded past the arms, and thus form reenforced joints between the sections when the latter are pressed together and unified in passage through the die.

These objects, as well as others, are attained by the die assembly hereinafter described, and illustrated in the accompanying drawings, in which:

Fig. 4 is a side elevation of the nozzle, partly in section;

Fig. 5 is a side elevation of the core;

Fig. 6 is a vertical section of the spider ring;

Fig. 7 is a view in elevation of one of the spider arms;

Fig. 8 is a horizontal section thereof on the line 8—8 of Fig. 7; and

Fig. 9 is a perspective view of the spider arm.

Figure 3:
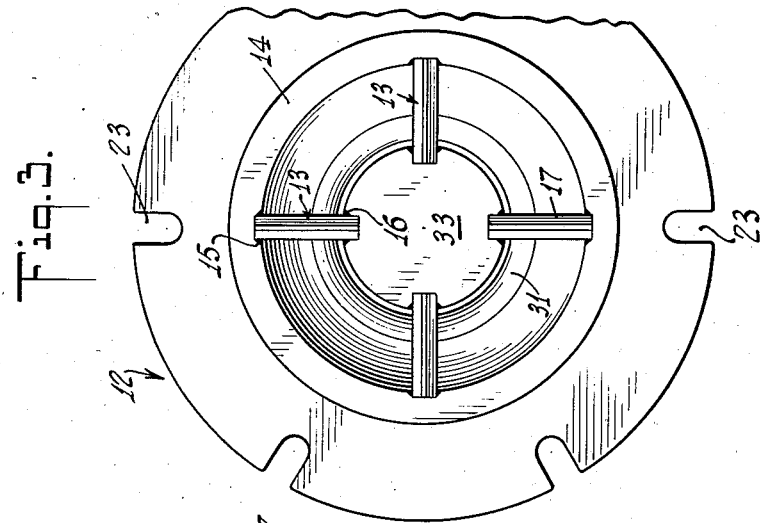
Fig. 3 is a rear end view thereof.
Figure 1:
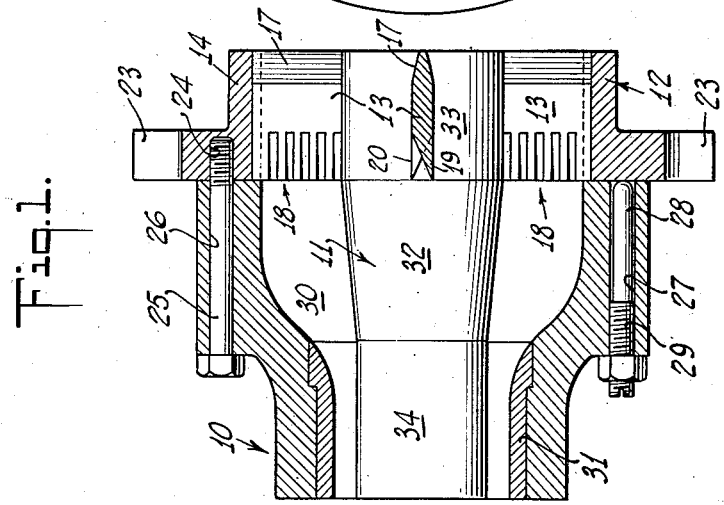
Figure 1 is a vertical section of the die assembly, the core being shown in elevation.
Figure 2:
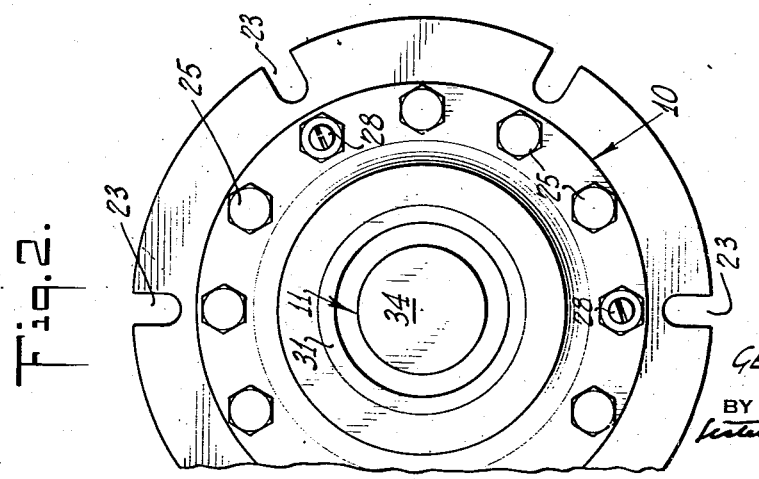
Fig. 2 is a front end view of the die assembly.

The die assembly shown in Figure 1 comprises generally a die nozzle 10, a core 11, and a core bridging or spider 12.

The spider has a plurality of radial arms 13, usually four, each secured at one end to the core 11 and at the other end to the spider ring 14. The arms may be cast integrally with the core and ring but preferably they are formed separately and welded in place. For this purpose, chamfers 15 may be formed in the inner face of the spider ring, and similar chamfers 16 in the rear end portion of the core, to receive the top and bottom ends of the arms. The arms are made as thin as consistent with the requisite strength, and are preferably of the same width as the ring.

Each spider arm is formed with a tapered rear end 17 and a bifurcated front end 18, as best seen in Figs. 8 and 9. The two branches of the bifurcated end are each formed with a series of triangular shaped solid portions 19 and 20, respectively, and intervening slots or spaces 21 and 22, respectively, the solid portions of one branch lying in the same horizontal plane as the slots in the other. With this construction correspondingly shaped alternating tongues and grooves will be molded in the edge surfaces of the material passing and contacting the arms, as will be hereinafter described.

The periphery of the spider ring 14 has notches 23 for the reception of bolts for detachably securing the die assembly to an extrusion apparatus (not shown). One form of such apparatus with which the present die assembly may be used is illustrated in Patent No. 2,269,436 of January 13, 1942. The spider ring also has a series of threaded openings 24 for receiving the threaded ends of the bolts 25 by which the die nozzle is secured to the spider ring.

The die nozzle 10 has passages 26 for the bolts 25, and also passages 27 for the jack-screws 28, which latter passages are threaded at 29 as shown in Fig. 4. The jack-screws, of which there are usually three, are provided to permit of adjusting the nozzle relatively to the core, as will hereinafter be explained. The nozzle, furthermore, is formed with an enlarged, tapering chamber 30 in which the material is densely compressed in passing from the spider arms to the constricted front end of the nozzle. A smooth, polished, bushing 31 may be affixed in the front end of the nozzle.

The core member 11 is rigidly supported by the spider arms 13, and is preferably formed with a tapered intermediate portion 32 extending from the rear end portion 33 to the front end portion 34 of smaller diameter. The length of the tapered portion of the core corresponds substantially with that of the enlarged, tapered, chamber 30 of the nozzle.

In operation of the die assembly, when the plastic material being extruded passes the spider arms 13, the bifurcated, slotted, front ends thereof mold tongues and grooves in the opposed edges of the separated sections of the material, the tongues and grooves of one section being in alternation with those of the other. As the sections progress into the compression chamber 30 of the die, the tongues and grooves of adjacent sections interengage or interlock and are autogenously united, thus reenforcing the joints and effecting an increased area of contact of one section with the other. As the built-up pressure increases in extrusion of the material from the die, the joints are completely obliterated and a straight length of pipe of homogeneous structure is produced.

Due to wear on the surfaces of the die, or from other causes, the pipe is sometimes extruded with a slight curve instead of absolutely in a straight line. This defect may be overcome, and any tendency to curve counteracted, by slightly tilting the nozzle relatively to the core. To effect this result the bolts 25, that secure the nozzle to the spider, are loosened, and the several jack-screws 28, the inner ends of which abut against the face of the spider ring 14, are turned as required, whereupon the bolts are again tightened. Adjustments of only a few thousandths of an inch are usually sufficient.

While I have shown and described a preferred embodiment of the die assembly, it is to be understood that various modifications thereof may be made within the scope of the invention set forth in the claims.

What I claim is:

1. In an extrusion die assembly, a movable nozzle, a fixed core, a core bridge having radial arms supporting the core, and means for tiltably adjusting the nozzle relative to the core comprising a plurality of jack-screws carried by the nozzle and abutting against a face portion of the core bridge.

2. In an extrusion die assembly, the combination of a stationary core, a fixed support for the core, a movable nozzle, and means carried by the nozzle and acting on the core support for tiltably adjusting the nozzle relative to the core.

GEORGE RITTER.